(12) United States Patent
Gore et al.

(10) Patent No.: US 7,477,278 B2
(45) Date of Patent: Jan. 13, 2009

(54) SUBSTRATE HAVING DYE LAYERS THAT LOCATIONALLY CHANGE IN COLOR UPON EXPOSURE TO BEAM

(75) Inventors: Makarand P. Gore, Corvallis, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 11/400,101

(22) Filed: Apr. 8, 2006

(65) Prior Publication Data

US 2007/0237919 A1 Oct. 11, 2007

(51) Int. Cl.
*B41J 2/435* (2006.01)
(52) U.S. Cl. .................................................. 347/224
(58) Field of Classification Search ................ 347/221, 347/262, 224, 225
See application file for complete search history.

(56) References Cited

U.S. PATENT DOCUMENTS

| | | | | |
|---|---|---|---|---|
| 4,755,831 A | * | 7/1988 | Sakamoto | ............... 347/172 |
| 4,828,957 A | | 5/1989 | Yonese | |
| 5,410,335 A | | 4/1995 | Sawano | |
| 5,424,164 A | * | 6/1995 | Satomura et al. | ............ 430/138 |
| 5,929,890 A | | 7/1999 | Kakinuma | |
| 2003/0108708 A1 | | 6/2003 | Anderson et al. | |
| 2003/0114302 A1 | | 6/2003 | Shimada | |
| 2003/0161224 A1 | | 8/2003 | Anderson | |
| 2003/0179679 A1 | | 9/2003 | Morishima | |
| 2005/0099929 A1 | | 5/2005 | Yamamoto | |

FOREIGN PATENT DOCUMENTS

| | | |
|---|---|---|
| EP | 1114736 | 7/2001 |
| JP | 2002-203321 | 7/2002 |
| WO | 02/096665 | 12/2002 |
| WO | 03/032299 | 4/2003 |
| WO | 2005/104126 | 11/2005 |
| WO | 2005/120849 | 12/2005 |
| WO | 2006/069043 | 6/2006 |

OTHER PUBLICATIONS

PCT International Search Report; Patent Application No. PCT/US2007/008391; filed Apr. 5, 2007; Report issued Oct. 5, 2007.

* cited by examiner

*Primary Examiner*—Hai C Pham

(57) ABSTRACT

A substrate has a first dye layer that locationally changes in color to a first color upon exposure to an optical beam at a first power level, and a second dye layer that locationally changes in color to a second color upon exposure to the optical beam at the second power level. The optical beam impinges a region of the substrate to render the region with a color selected from at least one of the first color and the second color. The optical beam impinges the region at a power level selected from at least the first power level and the second power level.

7 Claims, 6 Drawing Sheets

SUBSTRATE HAVING DYE LAYERS THAT LOCATIONALLY CHANGE IN COLOR UPON EXPOSURE TO BEAM

BACKGROUND

Optical disc drives have historically been used to optically read data from and optically write data to data regions of optical discs. More recently, optical disc drives have been used to optically write images to label regions of optical discs. For example, in the patent application entitled "Integrated CD/DVD Recording and Label", filed on Oct. 11, 2001, and assigned Ser. No. 09/976,877, a type of optical disc is disclosed in which a laser or other optical beam can be used to write to the label surface of an optical disc. However, the approach provided in that patent application does not necessarily lend itself to full color labeling of an optical disc.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

It is noted that embodiments of the invention are substantially described in relation to an optical disc. However, other embodiments of the invention are applicable to other types of substrates. That is, a substrate may be or may be part of an optical disc, or may be part of another type of material that may or may not be rotated upon insertion in a storage device like an optical disc drive. Thus, whereas the following description is directed towards an optical disc, other embodiments of the invention are applicable to substrates other than an optical disc.

Optical Disc

Figure 1A:
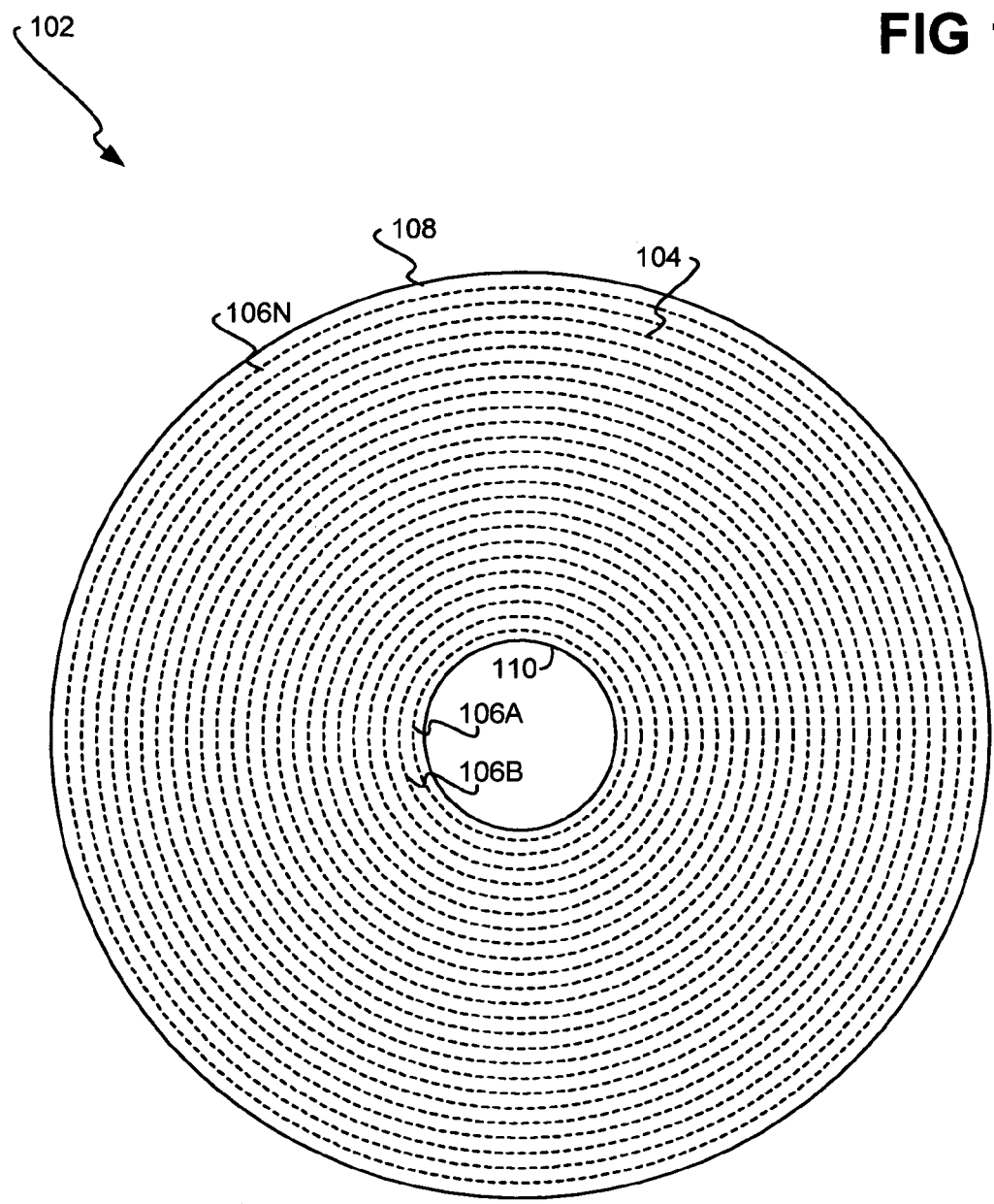
FIGS. 1A, 1B, and 1C are diagrams of an optical disc, according to varying embodiments of the invention.

FIG. 1A shows the label surface 104 of an optical disc 102, according to an embodiment of the invention. The label surface 104 can be considered as having a number of logical tracks 106A, 106B, . . . , 106N, collectively referred to as the tracks 106, extending from an inner circumference 110 to an outside circumference 108 of the optical disc 102. The tracks 106 are depicted in FIG. 1 as being concentric circular tracks. However, in another embodiment, the tracks 106 may be different portions of a single spiral extending from the inner circumference 110 to the outside circumference 108 of the optical disc 102.

The tracks 106 are logical in the sense that, at least in some embodiments of the invention, they are not physically preformed or otherwise formed on the label surface 104. Rather, the tracks 106 denote and correspond to the paths over which an optical beam travels to selectively write to the label surface 104 to form a desired image on the label surface 104, as is described in more detail later in the detailed description. Thus, as the optical disc 102 rotates, an optical beam, such as a laser, is moved to the different tracks 106 and selectively impinges the label surface 104 on different positions or regions of the tracks 106 to write a desired image on the label surface 104.

Figure 1B:
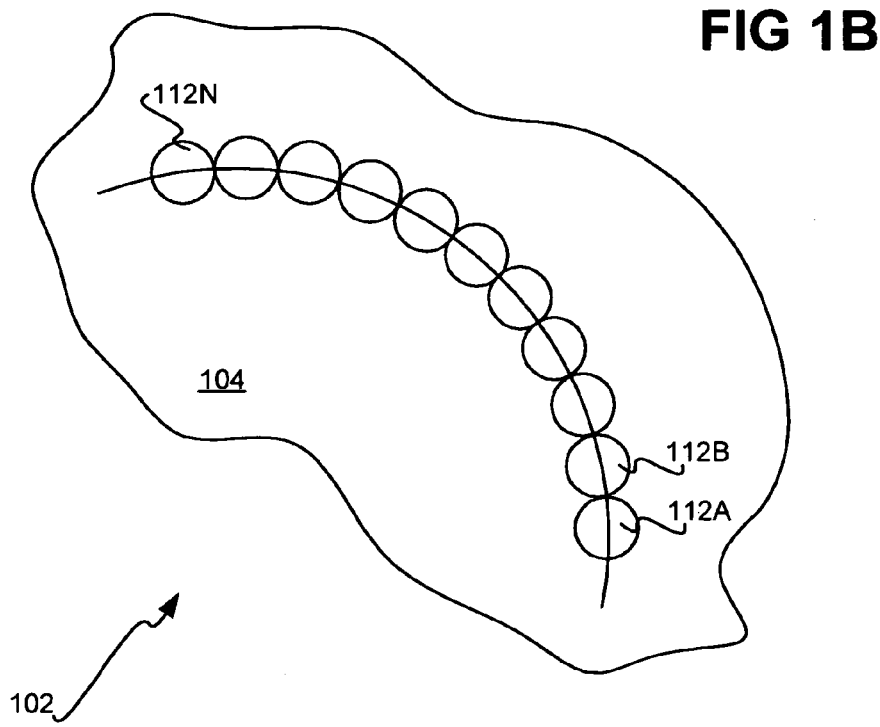

FIG. 1B shows a portion of the label surface 104 of the optical disc 102 in more detail, according to an embodiment of the invention. Specifically, a portion of the track 106B is depicted in FIG. 1B as representative of all the tracks 106 of the label surface 104. The track 106B includes logical regions 112A, 112B, . . . , 112N, collectively referred to as the logical regions 112.

The regions 112 are logical in the sense that, in at least some embodiments of the invention, they are not physically preformed or otherwise formed on the label surface 104. Rather, the regions 112 denote and correspond to the different positions to which an optical beam may selectively write to the label surface 104A to form a desired image on the label surface 104, as is described in more detail later in the detailed description. Thus, as the optical disc 102 rotates, and when an optical beam is positioned over the track 106B, the optical beam selectively impinges the regions 112 to write a desired image on the label surface 104.

Figure 1C:
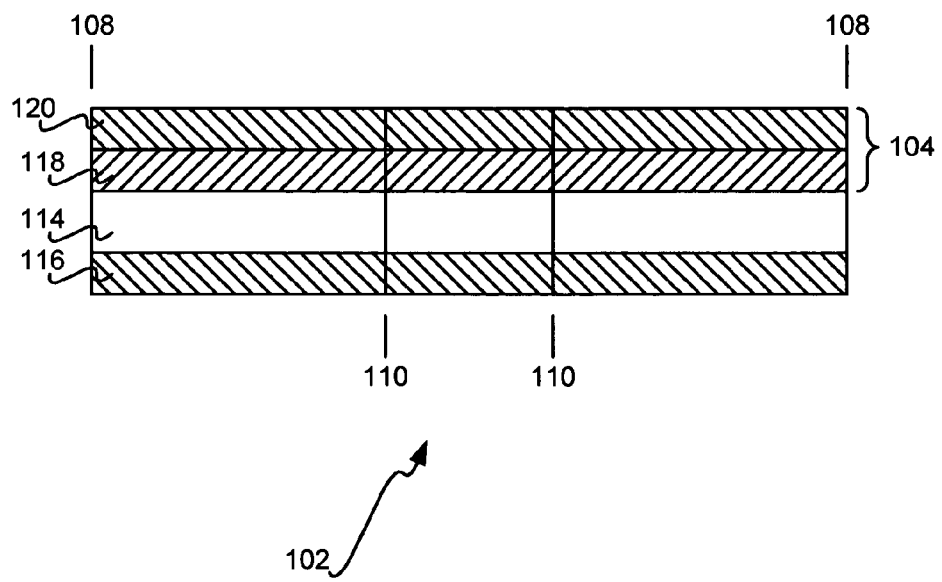

FIG. 1C shows a cross section of the optical disc 102, according to an embodiment of the invention. The optical disc 102 includes a substrate 114, on which the label surface 104 is disposed to one side of the substrate 114, and a data surface 116 is disposed on the other side of the substrate 114. While the label surface 104 is for optically writing a human-viewable image thereto, the data surface 116 is for optically writing data thereto. Thus, the optical disc 102 is a computer-readable medium, where a computing device may be able to write data to and/or read data from the data surface 116. By comparison, the primary purpose of the label surface 104 is for the formation of a human-viewable image thereon, which may, for instance, indicate what data has been stored on the data surface 116.

The terminology optically written is used in a broad sense herein. It can include opto-mechanical writing, as well as writing to a thermally sensitive surface. The optical part of this terminology can employ both visible light, as well as non-visible light, such as ultraviolet radiation, infrared radiation, and other types of electromagnetic radiation.

The data surface 116 of the optical disc 102 may be that of a compact disc (CD), a CD-readable (CD-R), which can be optically written to once, a CD-readable/writable (CD-RW), which can be optically written to multiple times, and so on. The data surface 116 may further be the data-recordable layer of a digital versatile disc (DVD), a DVD-readable (DVD-R), or a DVD that is readable and writable, such as a DVD-RW, a DVD-RAM, or a DVD+RW. The data surface 116 may also be the data-recordable layer of a high-capacity optical disc, such as a Blu-ray optical disc, and so on.

The label surface 104 includes two dye layers 118 and 120. Each of the dye layers 118 and 120 is able to locationally change in color upon exposure to an optical beam at a predetermined power level. "Locationally changing in color" means that the respective dye layer changes in color where it is exposed to the optical beam. For example, each of the regions 112 of FIG. 1B can be selectively exposed to the optical beam, at different power levels, independent of the exposure of the optical beam to the other of the regions 112. In this way, different regions can be changed to different colors to form an image on the label surface 104 of the optical disc 102.

The dye layers 118 and 120 correspond to different colors and correspond to different power levels at which optical beam exposure causes a color change. For example, the dye layer 118 may change to a first color when exposed to an optical beam at a first power level, whereas the dye layer 120 may change to a second color, different than the first color, when exposed to an optical beam at a second power level, different than the first power level. The second power level in one embodiment may particularly be greater than the first power level.

Different compositions of the dye layers 118 and 120, in accordance with different embodiments of the invention, are now described in detail. Different manners by which an image may be formed on the label surface 104 of the optical disc 102 by locationally changing the color of the regions 112 of the label surface 104 are also now described in detail. Those of ordinary skill within the art can appreciate that embodiments of the invention are not limited to just the embodiments described herein, however, and that other embodiments of the invention can be adapted therefrom.

FIRST EMBODIMENT

In one embodiment of the invention, the dye layers 118 and 120 are of different dye types. The dye layer 118, for instance, may be 4-morpholino-2,5-dibutoxybenzenediazonium hexafluorophosphate, or another type of diazo dye. Such a dye loses its color-changing ability when exposed to light having a wavelength of 400±50 nanometers. Stated another way, where the dye layer 118 is normally locationally changeable in color when exposed to an optical beam at a certain power level, if a region of the dye layer 118 is initially exposed to radiation of a predetermined wavelength, the subsequent impinging of the optical beam onto that region will not change the color of the dye layer 118.

The dye layer 120 may be isobenzofuran-type dye, a fluoran-type dye, and/or an amino fluoran-type dye, or another type of leuco dye. In one embodiment, the power level of an optical beam at which the dye layer 120 changes in color is greater than the power level of the optical beam at which the dye layer 118 changes in color. Furthermore, in one embodiment, both the dye layers 118 and 120 are sensitive to the same wavelength of an optical beam. That is, the dye layer 118 changes in color when exposed to an optical beam of a predetermined wavelength at a first power level, and the dye layer 120 changes in color when exposed to an optical beam of the same predetermined wavelength but at a second power level greater than the first power level.

Figure 2:
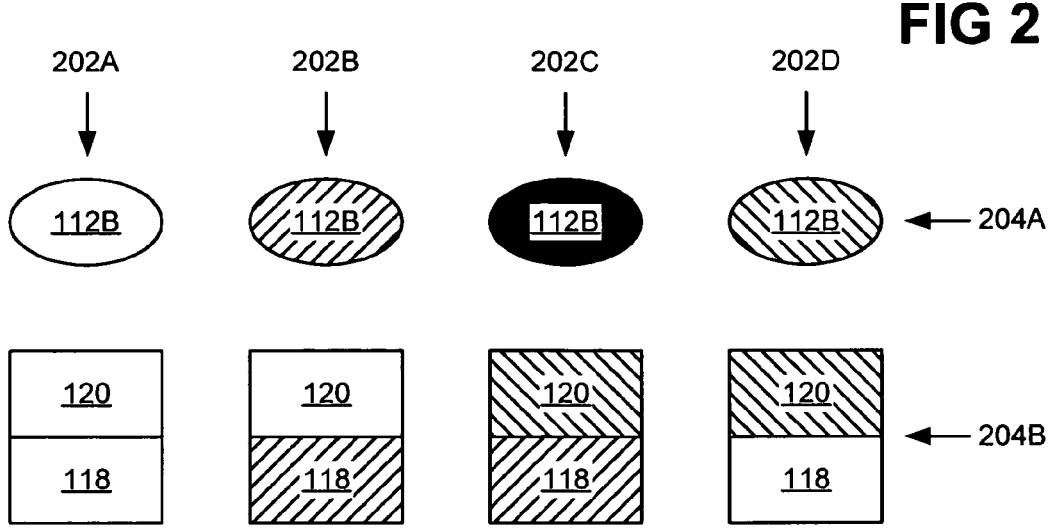
FIG. 2 is a diagram depicting how regions of the label surface of an optical disc can be selectively changed to one of three colors, according to an embodiment of the invention.

FIG. 2 shows how such dye layers 118 and 120 may be employed to realize a multiple-color label surface on an optical disc, according to an embodiment of the invention. In particular, four different examples, denoted by the columns 202A, 202B, 202C, and 202D, show how different colors can be achieved for a given representative region 112B on the label surface of an optical disc. For each of these four examples, the row 204A shows the region 112B itself, the row 204B shows a cross-sectional portion of the dye layers 118 and 120 corresponding to this region 112B, and the row 204C depicts the power level of an optical beam that impinges the region 112B.

With respect to the row 204C, three power levels 205, 206, and 208 are particularly depicted. The power level 205 corresponds to a zero power level of the optical beam impinging the region 112B, such that the optical beam can be considered as not being turned on at all when passing over the region 112B. The power level 206 corresponds to a power level of the optical beam impinging the region 112B at which the dye layer 118 changes in color. The power level 208 corresponds to a power level of the optical beam impinging the region 112B at which the dye layer 120 also changes in color, and is greater than the power level 206.

In the example of the column 202A, in the row 204C, the optical beam does not impinge the region 112B, as indicated by the arrow 210A, or stated another way, impinges the region 112B with a zero power level. As a result, neither the dye layer 118 nor the dye layer 120 change color in the row 204B, such that the region 112B does not change color in the row 204A. In the example of the column 202B, in the row 204C, the optical beam impinges the region 112B at the first power level 206, as indicated by the arrow 210B. As a result, just the dye layer 118 changes color in the row 204B, as indicated by the dye layer 118 being shaded. Therefore, the region 112B in the row 204A is changed to the color to which the dye layer 118 has changed.

In the example of the column 202C, in the row 204C, the optical beam impinges the region 112B at the second power level 208, as indicated by the arrow 210C, which is greater than the first power level 206. As a result, both the dye layers 118 and 120 change color in the row 204B, as indicated by the layers 118 and 120 being shaded. The region 112B in the row 204A is changed to a predetermined combination of the color to which the dye layer 118 has changed and the color to which the dye layer 120 has changed, as is explained in more detail below.

In the example of the column 202D, in the row 204C, the region 112B is exposed to the radiation "+R" at the predetermined wavelength as indicated by the reference number 212 in FIG. 2 to prevent dye layer 118 from changing in color upon exposure to an optical beam at the power levels 206 or 208. Subsequently, when the optical beam impinges the region 112B at the second power level 208, as indicated by the arrow 210D, just the dye layer 120 changes color in the row 204B, as indicated by the layer 120 being shaded. The region 112B in the row 204A is changed to the color to which the dye layer 120 has changed.

Therefore, as has been described, each region of the label surface of an optical disc can be selectively exposed to radiation and/or selectively impinged by an optical beam at an appropriate power level to change the color of the region from that shown in the column 202A to one of three different and discrete colors. These three different colors correspond to the columns 202B, 202C, and 202D. One of the colors is the color to which the dye layer 118 changes upon. exposure to the power level 206, as in the column 202B. Another color is the color to which the dye layer 120 changes upon exposure to the power level 208, as in the column 202D. The third color is a predetermined combination of the colors to which the dye layers 118 and 120 change upon exposure to the power level 208, as in the column 202C.

Figure 3:
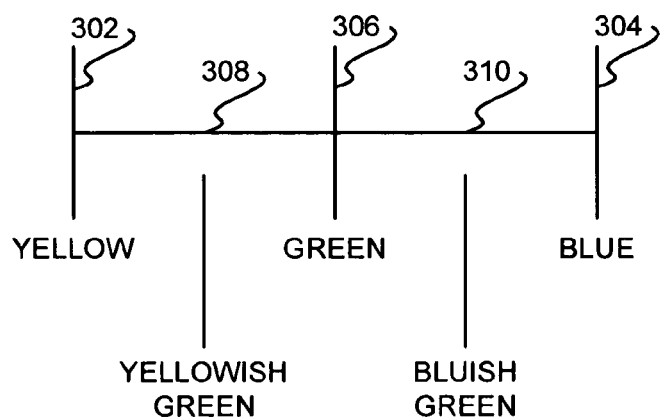
FIG. 3 is a diagram depicting how a combination of two colors can result in a third color, according to an embodiment of the invention.

FIG. 3 shows how a region of the label surface of an optical disc is changed to a combination of the colors to which the dye layers 118 and 120 change upon exposure to the power level 208, depending on the intensities of these two colors, according to an embodiment of the invention. In FIG. 3, as one example, the color to which the dye layer 118 changes upon exposure to an optical beam at least at the power level 206 is yellow, as indicated by the line 302. Furthermore, as one example, the color to which the dye layer 120 changes upon exposure to the optical beam at the power level 208 is blue, as indicated by the line 304.

If the intensity of the yellow color to which the dye layer 118 changes upon exposure to the optical beam at least at the power level 206 is equal in intensity of the blue color to which the dye layer 120 changes upon exposure to the optical beam at the power level 208, then the resulting combination of these two colors is green, as indicated by the line 306. That is, equal parts of the color yellow and the color blue render the color green, such that, in this example, the color of the region 112B in the column 202C of FIG. 2 is green, for instance. However, such a "perfect" green color may not result where the yellow and the blue colors do not have the same intensity.

For example, the yellow color to which the dye layer 118 changes upon exposure to the optical beam at least at the power level 206 may be greater in intensity than that of the blue color to which the dye layer 120 changes upon exposure to the optical beam at the power level 208. As a result, the combination of these two colors is a "yellowish green" color that is more yellow in color than blue in color, as indicated by the line 308. The greater the intensity of the yellow color as compared to the blue color, the greater the combination of these two colors is more yellowish green, such that the combination of these two colors is further to the left along the line 308.

As another example, the blue color to which the dye layer 120 changes upon exposure to the optical beam at the power level 208 may be greater in intensity than that of the yellow color to which the dye layer 118 changes upon exposure to the optical beam at least at the power level 206. As a result, the combination of these two colors is a "bluish green" color that is more blue in color than yellow in color, as indicated by the line 310. The greater the intensity of the blue color as compared to the yellow color, the greater the combination of these two colors is more bluish green, such that the combination of these two colors is further to the right along the line 310.

SECOND EMBODIMENT

In another embodiment of the invention, the dye layers 118 and 120 may be of the same or different dye types. For instance, both of the dye layers 118 and 120 may be isobenzofuran-type dye, a fluoran-type dye, and/or an amino fluoran-type dye, or another type of leuco dye. In one embodiment, however, the power level of an optical beam at which the dye layer 120 changes in color is greater than the power level of the optical beam at which the dye layer 118 changes in color. Furthermore, in one embodiment, both the dye layers 118 and 120 are sensitive to the same wavelength of an optical beam. That is, the dye layer 118 changes in color when exposed to an optical beam of a predetermined wavelength at a first power level, and the dye layer 120 changes in color when exposed to an optical beam of the same predetermined wavelength but at a second power level greater than the first power level.

Figure 4:
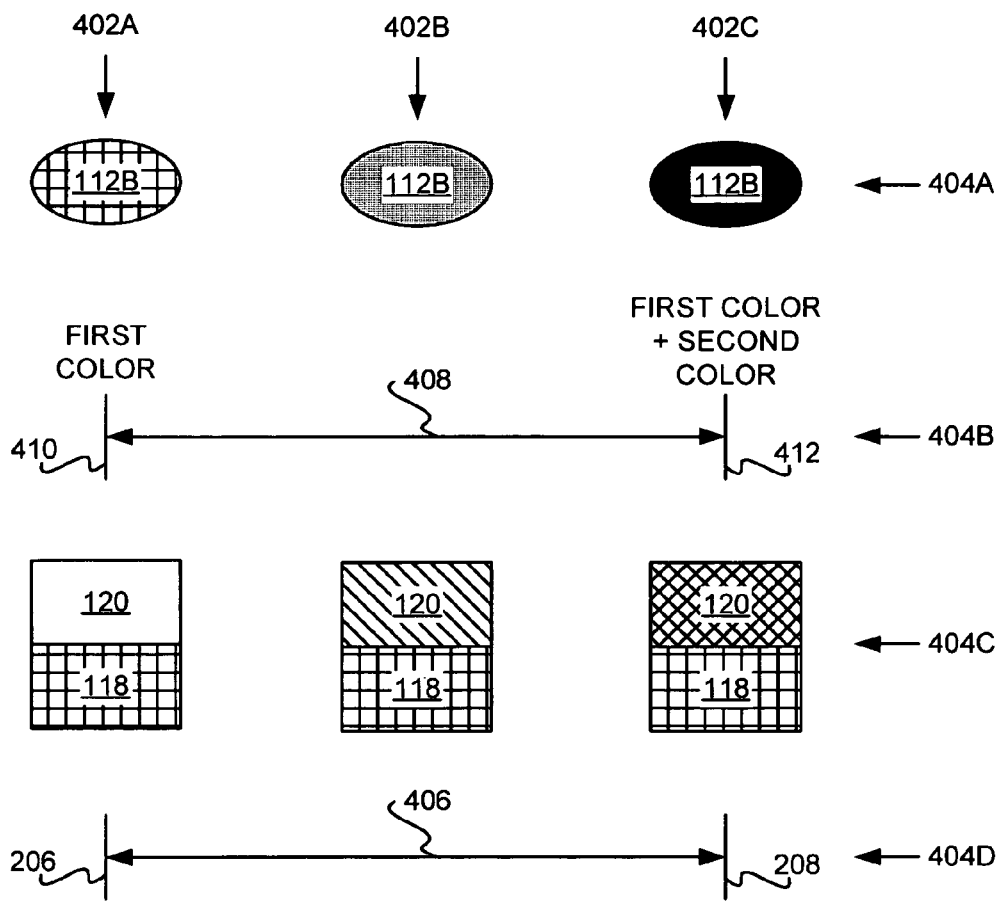
FIG. 4 is a diagram depicting how regions of the label surface of an optical disc can be selectively changed to a color within a range of colors, according to an embodiment of the invention.

FIG. 4 shows how such dye layers 118 and 120 may be employed to realize a multiple-color surface on an optical disc, according to an embodiment of the invention. In particular, three different examples, denoted by the columns 402A, 402B, and 402C, show how different colors can be achieved for a given representative region 112B on the label surface of an optical disc. For each of these three examples, the row 404A shows the region 112B itself, the row 404B depicts the variation in color of the region 112B along a range of colors, and the row 404C shows a cross-sectional portion of the dye layers 118 corresponding to the region 112B. Furthermore, the row 404D depicts the power level of an optical beam that impinges the region 112B.

With respect to the row 404D, the two power levels 206 and 208 are particularly depicted. The power level 206 corresponds to a power level of the optical beam impinging the region 112B at which the dye layer 118 changes in color. The power level 208 corresponds to a power level of the optical beam impinging the region 112B at which the dye layer 120 also changes in color, and is greater than the power level 206. Thus, at the power level 208, the optical beam impinging the region 112B causes both the dye layers 118 and 120 to change in color.

In the example of the first column 402A, in the row 404D, the optical beam impinges the region 112B at the first power level 206. As a result, just the dye layer 118 changes color in the row 404C, as indicated by the dye layer 118 being shaded. Therefore, within the range of colors of the row 404B, as indicated by the line 408, the color of the region 112B in the row 404A changes to the first color to which the dye layer 118 has changed, as indicated by the line 410.

In the example of the last column 402C, in the row 404D, the optical beam impinges the region 112B at the second power level 208. As a result, both the dye layers 118 and 120 change color in the row 404C, as indicated by the layers 118 and 120 being shaded. Therefore, within the range of colors of the row 404B, as indicated by the line 408, the color of the region 112B in the row 404A changes to a predetermined combination of the color to which the dye layer 118 has changed and the color to which the dye layer 120 has changed, as indicated by the line 412, and as has been explained in relation to FIG. 3.

Furthermore, it has been found that impinging the optical beam on a region of the label surface of an optical disc at a power level between the first power level 206 and the second power level 208 results in a different combination of the color to which the dye layer 118 changes and the second color to which the dye layer 120 changes. In such a new color combination, all of the first color (indicated by the line 410) to which the dye layer 118 changes is present, and a portion, but not the full amount or intensity, of the second color to which the dye layer 120 changes is also present. For example, in the middle column 402B, in the row 402D, the optical beam impinges the region 112B at a power level half-way between the first power level 206 and the second power level 208, along the range of power levels indicated by the line 406.

As a result, both the dye layers 118 and 120 change color in the row 404C, as indicated by the layers 118 and 120 being shaded. However, whereas the dye layer 118 completely changes to the first color, the dye layer 120 partially changes to the second color. For instance, where the response of the dye layer 118 to the power level of the optical beam is linear between the power levels 206 and 208, the dye layer 120 may change to a half intensity of the second color. That is, in such an example, where the dye layer 120 changes to a predetermined full intensity of the second color upon exposure to the optical beam at the power level 208, it may change to half of this full intensity of the second color upon exposure to the optical beam at a power level half-way between the power levels 206 and 208.

Therefore, within the range of colors of the row 404B, as indicated by the line 408, the color of the region 112B in the row 404A changes to a combination of the color to which the dye layer 118 has changed and the color at partial intensity to which the dye layer 120 has changed. Whereas the color combination of the region 112B in the column 402C is that of the full intensities of the colors to which both the dye layers 118 and 120 have changed, in the column 402B the color combination of the region 112B is that of the full intensity of the color to which the dye layer 118 has changed and, assuming a linear response, of the half intensity of the color to which the dye layer 120 has changed. This is now discussed in more detail.

Figure 5:
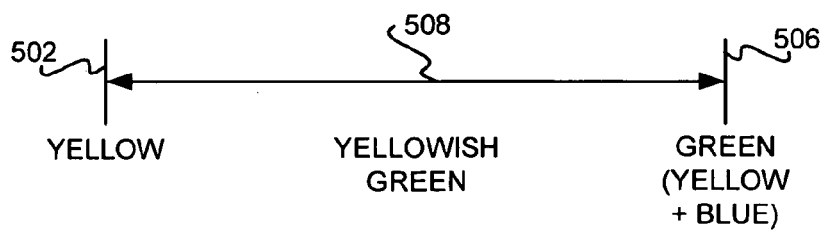
FIG. 5 is a diagram depicting how a range of colors can result from a combination of the full intensity of one color and a varying intensity of another color, according to an embodiment of the invention.

For instance, FIG. 5 shows how a region of the label surface of an optical disc is changed to one of a varying number of combinations of the colors to which the dye layers 118 and 120 change upon exposure to power levels between the power levels 206 and 208, according to an embodiment of the invention. In FIG. 5, as one example, the color to which the dye layer 118 changes upon exposure to an optical beam at least at the power level 206 is a predetermined intensity of yellow. Furthermore, as one example, the color to which the dye layer 120 changes upon exposure to the optical beam at the power level 208 is a predetermined intensity of blue. Therefore, upon exposure to the optical beam at the first power level 206, the region in question is yellow, as indicated by the line 502, whereas upon exposure to the optical beam at the second power level 208, the region is green, as indicated by the line 506, which is a combination of the full intensities of the yellow color of the dye layer 118 and the blue color of the dye layer 120.

However, as has been noted above, it has been found that exposing a region of the label surface of an optical disc to an optical beam at a power level between the first power level 206 and the second power level 208 results in the region changing in color to a color between that of the yellow color corresponding to the line 502 and the combination blue and yellow (i.e., green) color correspond to the line 506, as indicated by the line 508. The closer the power level of the optical beam that is impinging the region in question is to the power level 208, the less yellowish green in color the region is, towards the right hand side of the line 508. This is because the closer the power level is to the power level 208, the greater in intensity the dye layer 120 changes to the color blue.

Similarly, the closer the power level of the optical beam that is impinging the region in question is to the power level 206, the more yellowish green in color the region is, towards the left hand side of the line 508. This is because the closer the power level is to the power level 206, the lesser in intensity the dye layer 120 changes to the color blue, such that the full intensity of the yellow color of the dye layer 118 contributes more to the resulting combination of colors of the region. In other words, it has been found that there is a power level 208 at which the dye layer 120 changes in full intensity to its given color, such that at power levels less than the power level 208, the dye layer 120 still changes to the color in question, but at a lesser intensity.

As a result, a region of the label surface of an optical disc can be changed to one of a range of colors corresponding to the line 508, between the color corresponding to the line 502, and the combination of colors corresponding to the line 506. By selectively impinging an optical beam at a power level between the power levels 206 and 208, the color of the region can be changed to a color within this range of colors. The embodiment of the invention that has been described in exemplary relation to FIGS. 4 and 5 therefore contrasts to that which has been described in exemplary relation to FIGS. 2 and 3, in that in the latter embodiment a region of the label surface of an optical disc can be changed to one of just three different and discrete colors. By comparison, in the former embodiment that just been described, the region can be changed to one of a range of different colors, where the range itself may be continuous, and linear or non-linear, in nature.

Method and Optical Drive

Figure 6:
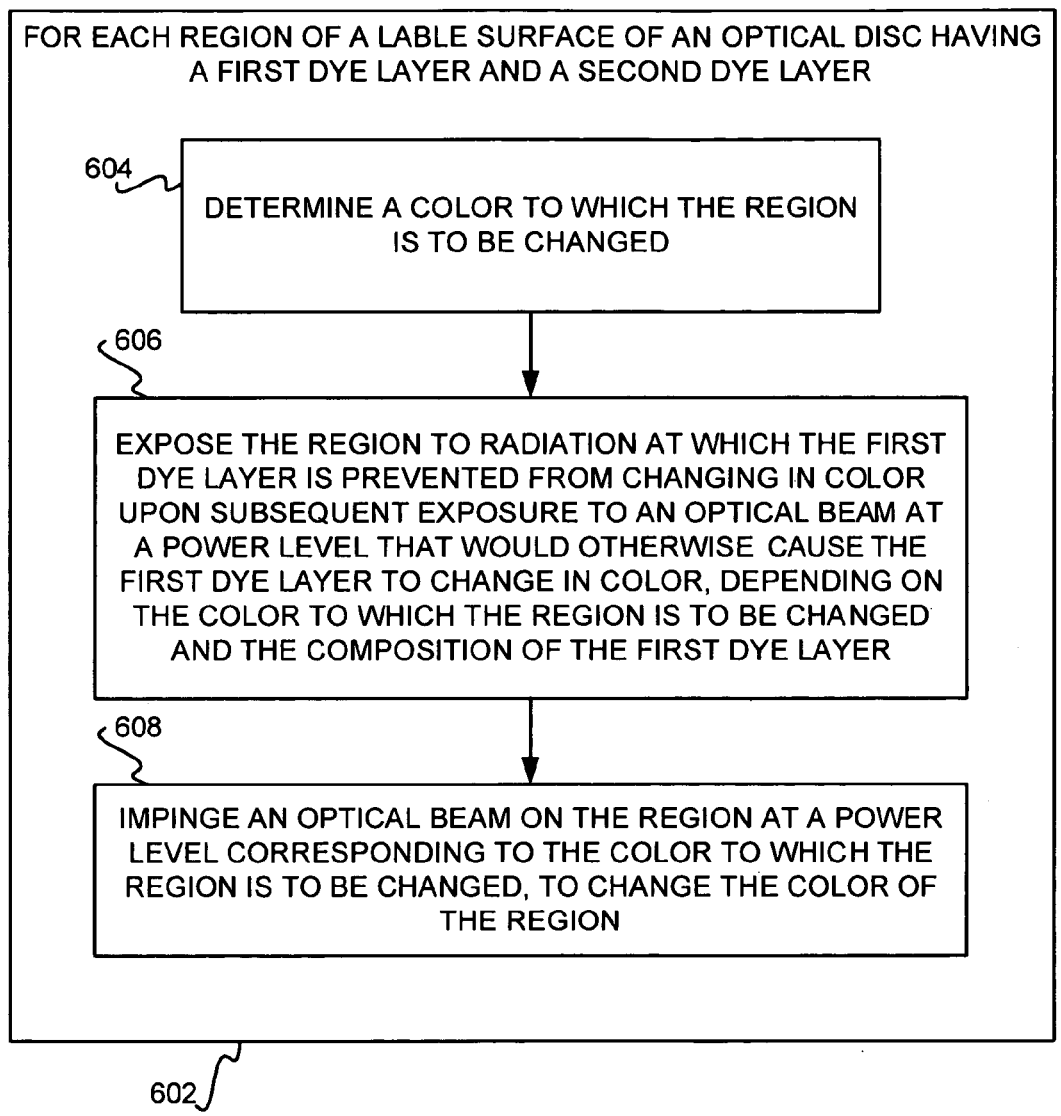
FIG. 6 is a flowchart of a method for optically writing a multiple-color image to the label surface of an optical disc, according to an embodiment of the invention.

FIG. 6 shows a method 600 for forming a multiple-color image on the label surface of an optical disc, according to an embodiment of the invention. As indicated by reference number 602, parts 604, 606, and 608 are performed for each region of the label surface of an optical disc that is to change in color. The label surface itself includes a first dye layer and a second dye layer, as has been described.

First, the color to which the region in question is to be changed is determined (604). The color may be determined based on the image that is to be optically written to the label surface of the optical disc as a whole. In the first embodiment that has been described above, the color may be selected from one of three discrete colors: the color to which the first dye layer can change, the color to which the second dye layer can change, and a predetermined combination of these two colors. In the second embodiment that has been described above, the color may be selected from a range of colors, ranging from the color to which the first dye layer can change, to the predetermined combination of this color and the color to which the second dye layer can change, in full intensity.

Thereafter, in the first embodiment, the region may be initially exposed to radiation to prevent the first dye layer from changing color upon exposure to an optical beam at a power level greater than the power level at which the first dye layer changes color (606). For instance, the color of the region may be desired to be changed to just the color to which the second dye layer changes in color upon being exposed to a second power level greater than a first power level at which the first dye layer changes in color. Therefore, in this case, the region is exposed to radiation of a wavelength at which the first dye layer is locked, such that it will not change in color upon exposure to the second power level greater than the first power level at which it would normally change in color.

Finally, an optical beam is impinged on the region at a power level corresponding to the color to which the region is to be changed, to change the color of the region (608). For instance, in the first embodiment that has been described above, where the color of the region is to change to the color to which the first dye layer can change, the optical beam impinges the region at the first power level at which the first dye layer changes color. Where the color of the region is to change to the color to which the second dye layer can change, either alone or in combination with the color to which the first dye layer can change, the optical beam impinges the region at the second power level at which the second dye layer also changes color.

In the second embodiment that has been described above, the optical beam impinges the region at a power level between the first power level at which the first dye layer changes color and the second power level at which the second dye layer also changes color, depending on the desired color of the region. For instance, as has been described, there may be a linear change in color from the color to which the first dye changes at full intensity, to a combination of the color to which the first dye changes at full intensity and the color to which the second dye changes at full intensity. Therefore, a corresponding power level is selected at which the optical beam is to impinge the region in question so that the region is changed to the desired color within this range.

Figure 7:
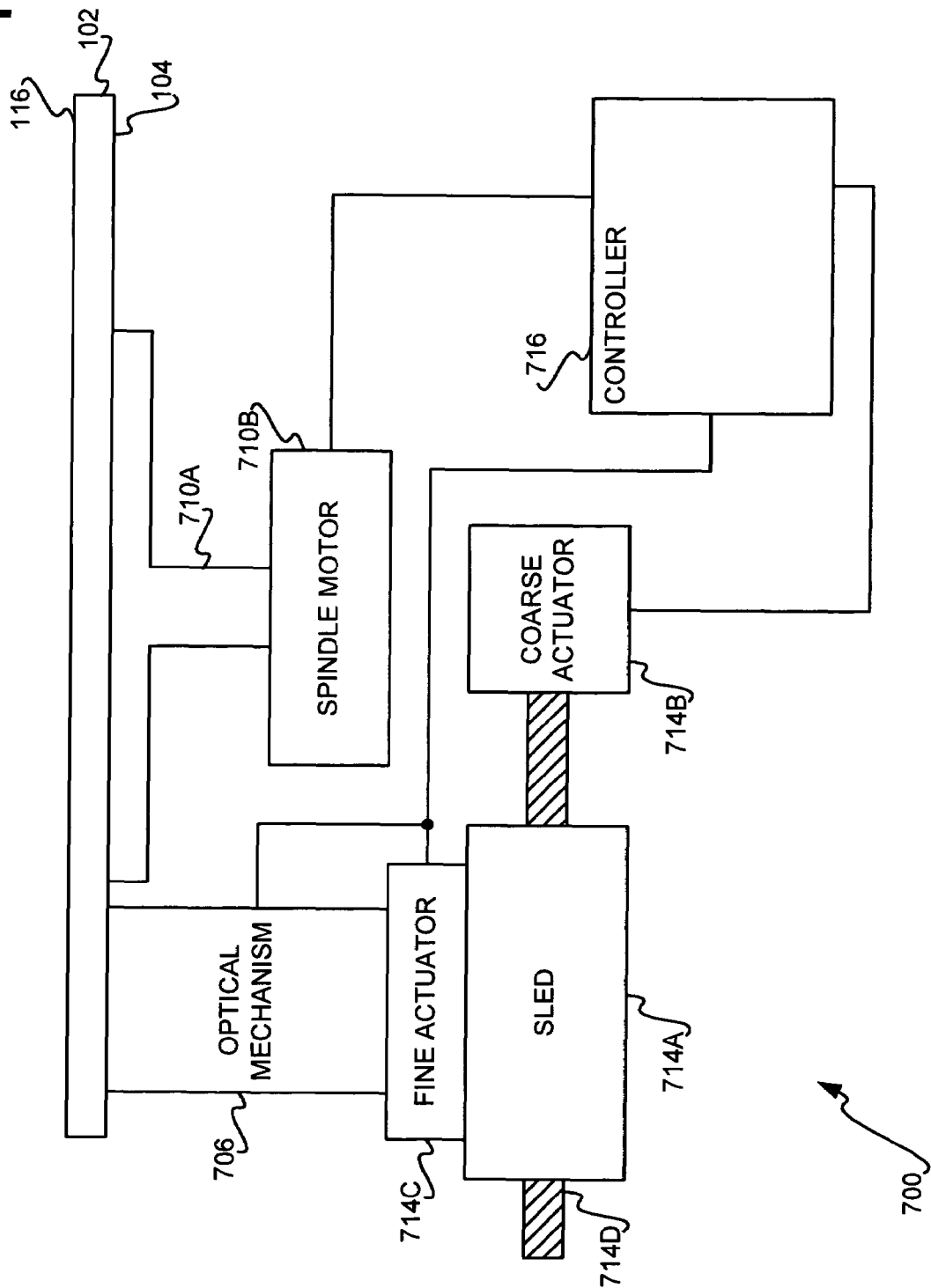
FIG. 7 is a diagram of an optical disc drive, according to an embodiment of the invention.

FIG. 7 shows an optical disc drive 700, according to an embodiment of the invention. The optical drive 700 is at least for optically writing a multiple-color image to the label surface 104 of the optical disc 102, as has been described. As can be appreciated by those of ordinary skill within the art, the components depicted in the optical drive 700 are representative of one embodiment of the invention, and do not limit all embodiments of the invention.

The optical drive 700 is depicted in FIG. 7 as including an optical mechanism 706. The optical mechanism 706 is capable of emitting optical beams of the same or different wavelengths at different power levels onto the optical disc 102 to cause the dye layers of the label surface 104 to change color as has been described. The optical mechanism 706 may include a focusing mechanism, such as an objective lens. Furthermore, the optical mechanism 706 may include a radiation source that is able to selectively and individually expose the regions of the label surface 104 to radiation of a wavelength at which one of the dye layers is prevented from subsequently changing in color, as has been described.

The optical drive 700 is also depicted in FIG. 7 as including a spindle 710A and a spindle motor 710B, which are collectively referred to as the first motor mechanism 710. The spindle motor 710B rotates the spindle 710A, such that the optical disc 102 correspondingly rotates. The first motor mechanism 710 may include other components besides those depicted in FIG. 7. For instance, the first motor mechanism 710 may include a rotary encoder or another type of encoder to provide for control of the spindle motor 710B and the spindle 710A.

The optical drive 700 is further depicted in FIG. 7 as including a sled 714A, a coarse actuator 714B, a fine actuator 714C, and a rail 714D, which are collectively referred to as the second motor mechanism 714. The second motor mechanism 714 moves the optical mechanism 706 to radial locations relative to a surface of the optical disc 102. The coarse actuator 714B is or includes a motor that causes the sled 714A, and hence the fine actuator 714C and the optical mechanism 706 situated on the sled 714A, to move radially relative to the optical disc 102 on the rail 714D. The coarse actuator 714B thus provides for coarse or large radial movements of the fine actuator 714C and the optical mechanism 706.

By comparison, the fine actuator 714C also is or includes a motor, and causes the optical mechanism 706 to move radially relative to the optical disc 102 on the sled 714A. The fine actuator 714C thus provides for fine or small movements of the optical mechanism 706. The second motor mechanism 714 may include other components besides those depicted in FIG. 7. For instance, the second motor mechanism 714 may include a linear encoder or another type of encoder to provide for control of the coarse actuator 714B and the sled 714A. Furthermore, either or both of the motor mechanisms 710 and 714 may be considered as the movement mechanism of the optical drive 700.

It is noted that the utilization of a fine actuator 714C and a coarse actuator 714B, as part of the second motor mechanism 714, is representative of one, but not all, embodiments of the invention. That is, to radially move the optical mechanism 706 in relation to the optical disc 102, the embodiment of FIG. 7 uses both a fine actuator 714C and a coarse actuator 714B. However, in other embodiments, other types of a second motor mechanism 714 can be used to radially move the optical mechanism 706 in relation to the optical disc 102, which do not require both a fine actuator 714C and a coarse actuator 714B. For instance, a single actuator or other type of motor may alternatively be used to radially move and position the optical mechanism 706 in relation to the optical disc 102.

The optical drive 700 is additionally depicted in FIG. 7 as including a controller 716. The controller 716 may be implemented in software, hardware, or a combination of software and hardware. The controller 716 controls movement of the first motor mechanism 710 and the second motor mechanism 714 to move the optical mechanism 706 in relation to the optical disc 102, and to rotate the optical disc 102. The controller 716 is further to cause the optical mechanism 706 to selectively emit optical beams at different power levels onto the regions of the label surface 104 of the optical disc 102 that are to change in color, as has been described, to optically write a multiple-color image on the label surface 104 of the optical disc 102. Furthermore, the controller may cause one or more of these regions to be exposed to the radiation of the predetermined wavelength that prevents one of the dye layers of the label surface 104 from subsequently changing in color, as has also been described.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of the disclosed embodiments of the present invention. Therefore, it is manifestly intended that this invention be limited only by the claims and equivalents thereof.

We claim:

1. A method for marking a substrate, comprising:
   in relation to the substrate having a first dye layer that locationally changes in color to a first color upon exposure to an optical beam at a first power level and a second dye layer that locationally changes in color to a second color upon exposure of the optical beam at a second power level, where the second dye layer partially changes in color to the second color upon exposure of the optical beam at a third power level greater than the first power level, the third power level being less than the second power level,
   impinging the optical beam on a region of the substrate to render the region with a third color being a combination of a full intensity of the first color and a partial intensity of the second color, the optical beam impinging the region at the third power level, the third power level corresponding to the third color.

2. The method of claim 1, wherein the first dye layer is responsive to radiation of a predetermined wavelength to prevent the first dye layer from locationally changing in color to the first color upon exposure to the first power level, the method further comprising exposing the region of the substrate to radiation of the predetermined wavelength, wherein impinging the optical beam on the region of the substrate at the second power level causes the region to change in color to the second color.

3. The method of claim 2, wherein the optical beam during impinging the region has a wavelength different than the wavelength to which the first dye layer is responsive to prevent the first dye layer from locationally changing in color.

4. The method of claim 1, wherein the first dye layer and the second dye layer locationally change in color in response to exposure to a same wavelength of the optical beam, but at different power levels.

5. An optical disc drive comprising:

an optical mechanism capable of emitting an optical beam at different power levels onto an optical disc having a first dye layer that locationally changes color to a first color upon exposure to the optical beam at a first power level and a second dye layer that locationally changes color to the optical beam at a second color upon exposure to a second power level, where the second dye layer partially changes in color to the second color upon exposure of the optical beam at a third power level greater than the first power level, the third power level being less than the second power level; and, a controller to cause the optical mechanism to emit the optical beam onto at least one region of a plurality of regions of the optical disc that is to change in color to a third color being a combination of a full intensity of the first color and a partial intensity of the second color, at the third power level corresponding to the third color.

6. The optical disc drive of claim 5, wherein the controller is to cause the optical mechanism to emit the optical beam at the first power level onto each region that is to change in color to the first color.

7. The optical disc drive of claim 5, wherein the first dye layer is responsive to radiation of a predetermined wavelength to prevent the first dye layer from locationally changing in color to the first color upon exposure to the first power level, and the controller is to cause radiation of the predetermined wavelength to be subjected to each region that is to change in color to the second color and then cause the optical mechanism to emit the optical beam at the second power level onto each region that is to change color to the second color, the second power level being greater than the first power level.

* * * * *